(12) United States Patent
van der Merwe et al.

(10) Patent No.: US 9,146,814 B1
(45) Date of Patent: Sep. 29, 2015

(54) MITIGATING AN IMPACT OF A DATACENTER THERMAL EVENT

(71) Applicant: Amazon Technologies, Inc., Reno, NV (US)

(72) Inventors: Benjamin van der Merwe, Cape Town (ZA); Jean-Paul Bauer, Cape Town (ZA); Roland Paterson-Jones, Cape Town (ZA); James Alfred Gordon Greenfield, Cape Town (ZA); Christopher Richard Jacques de Kadt, Cape Town (ZA); Adi Meyers, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 13/975,886

(22) Filed: Aug. 26, 2013

(51) Int. Cl.
*G06F 11/00* (2006.01)
*G06F 11/14* (2006.01)

(52) U.S. Cl.
CPC .................................. *G06F 11/1441* (2013.01)

(58) Field of Classification Search
CPC .................................................. G06F 11/1441
USPC .......................................... 714/22, 25, 14, 6.3
See application file for complete search history.

(56) References Cited

U.S. PATENT DOCUMENTS

| | | | |
|---|---|---|---|
| 7,564,805 B1* | 7/2009 | Cortez et al. ................... | 370/255 |
| 2007/0101173 A1* | 5/2007 | Fung ............................. | 713/300 |
| 2010/0131781 A1* | 5/2010 | Memon et al. ................ | 713/310 |
| 2011/0239014 A1* | 9/2011 | Karnowski ..................... | 713/320 |
| 2013/0089104 A1* | 4/2013 | Davis et al. .................... | 370/401 |
| 2014/0222698 A1* | 8/2014 | Potdar et al. .................. | 705/317 |

\* cited by examiner

*Primary Examiner* — Dieu-Minh Le
(74) *Attorney, Agent, or Firm* — Klarquist Sparkman, LLP

(57) ABSTRACT

A ranking service can retrieve metrics from a metrics data store and use the metrics to determine a priority order in which to power down resources in a data center. Metrics from the data store can include a number of instances running on a host, a length of time that an instance has been operational, a type of instance, an amount of CPU use on a host, etc. The ranking service can also obtain other parameters from other sources. The parameters can include whether redundant or failover instances exist, the importance of the instances, whether the customer itself is considered important, other generic parameters from the customer account, a customer provided ranking of instances, etc.

19 Claims, 10 Drawing Sheets

SOFTWARE 1080 IMPLEMENTING DESCRIBED TECHNOLOGIES

MITIGATING AN IMPACT OF A DATACENTER THERMAL EVENT

BACKGROUND

Network-based services exist that allow customers to purchase and utilize instances of computing resources, such as virtual machine instances, on a permanent or as-needed basis. In addition to virtual machine instances, these services typically allow customers to purchase and utilize instances of other types of computing resources for use with the virtual machine instances. For example, customers might be permitted to purchase and utilize instances of data storage resources, instances of networking resources, and instances of other types of resources.

Managing network-based services, such as those described above, can be extremely complex. At least some of this complexity is attributable to the large number of instances of computing resources and other types of resources that typically exist in such a service at any given time. For example, some network-based services might utilize dozens of data centers around the world, hundreds of thousands or even millions of server computers, along with large numbers of networking components, software programs, and other types of resources.

In some instances, a thermal event can occur in a data center. The thermal event generally means that a temperature in a data center is excessive or can become excessive for running of server computers and other electronic components. One simple example that can cause a thermal event is when one or more air conditioning units fail. In the case of a thermal event, electronic devices can start to overheat and randomly shut down. Once the thermal event is over, the devices can randomly start back up, which can quickly increase temperature causing another thermal event.

DETAILED DESCRIPTION

Figure 1:
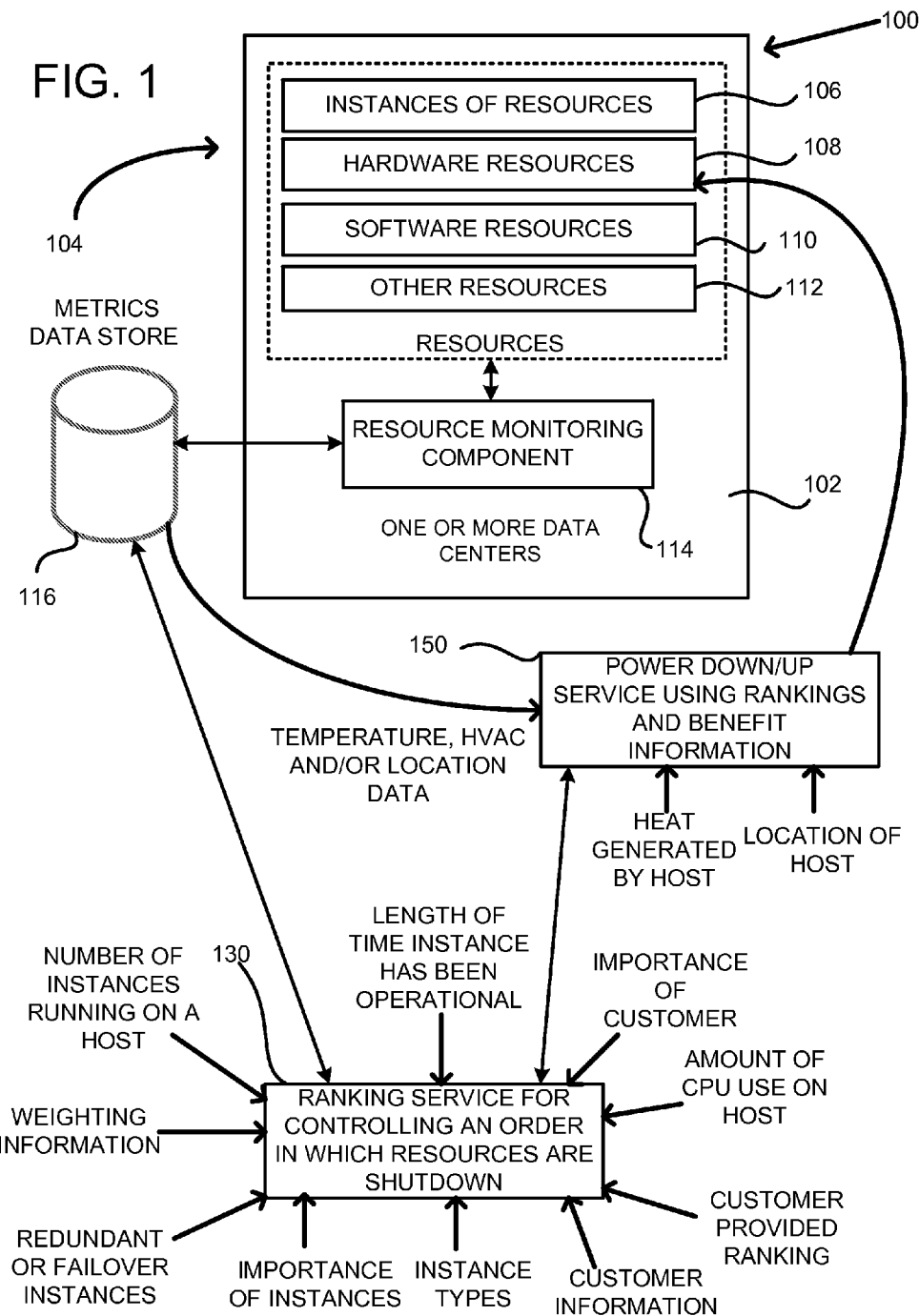
FIG. 1 is a system diagram of an embodiment for mitigating an impact of a thermal event in one or more data centers.

FIG. 1 is a computer system 100 providing an overview description of a mechanism for mitigating an impact of a data center thermal event in a distributed environment 102, including one or more data centers. Thermal events can occur for a variety of reasons, such as an increase in temperature of the data center, or a cooling system in the data center can be malfunctioning or powered down. In one embodiment, the system allows customers to purchase and utilize resources, shown generally at 104, including virtual machine instances 106, hardware resources 108, software resources 110, and other resources 112, on a permanent or as-needed basis. The resources can include host server computers, processor configurations, memory configurations, disk storage, operating systems, network devices, etc. The operator of the distributed environment 102 may charge a fee for operating the instances to the customer that creates the instances. Various different pricing models can be utilized to charge a customer for use of instances of resources within the distributed environment 102.

In some implementations, a resource monitoring component 114 executes within or in conjunction with the distributed environment 102 and collects data regarding the state of the resources 104. For example, the resource monitoring component 114 can collect data that describes the usage characteristics of resources 104. The usage characteristics can include CPU load, memory usage, number of instances on hosts, temperature within a host, temperature of a zone in the data center, an amount of time that an instance has been operational, redundancy of instances, instance types, etc.

In some embodiments, once the data is obtained, the resource monitoring component 114 can store the data in a metrics data store 116. The data store 116 or the resource monitoring component 114 can allow the collected data to be made available for consumption and use by other components. For example, in some embodiments, the resource monitoring component 114 is configured to expose an application programming interface ("API") or another mechanism through which interested parties can request and receive the data collected for a particular resource 104. It should be appreciated that while the data is discussed herein primarily in the context of data describing the operational state of a resource 104, the metrics stored in the data store 116 can include other information about a resource 104, such as information describing the configuration of the resource and other aspects of a resource, such as its location in the data center, a length of time that the resource has been operational, etc. In this way, the resource monitoring component 114 can be utilized to obtain virtually any type of information about a resource 104 in the distributed environment 102.

A ranking service 130 can retrieve metrics from the metrics data store 116 and use the metrics to determine a priority order in which to power down the resources 104 in the case of an emergency, such as a thermal event. Metrics from the data store can include a number of instances running on a host, a length of time that an instance has been operational, a type of instance, an amount of CPU use on a host, etc. Together such metrics can be considered operational parameters as they are associated with the operation of a host server computer. The ranking service 130 can also obtain other parameters or metrics from other sources as described herein. The parameters can include whether redundant or failover instances exist, the importance of the instances in the overall customer structure, whether the customer itself is considered important, other generic parameters from the customer account, a customer provided ranking of instances, etc. The ranking service 130 can further receive weighting information, which can be used to weight an impact of the parameters on an overall ranking order. The weighting information can be retrieved from a policy store, which can be accessed by an administrator through a portal.

The ranking service 130 can be coupled to a power-down/up service 150. Generally, the ranking service provides an overall cost of powering down a hardware resource. The power-down/up service 150 uses the cost information from the ranking service 130 together with a calculation of a benefit derived from powering down a hardware resource in order to make a final determination an order in which to power down the resources. For example, the power-down/up service can receive information regarding heat generated by a host and a location of a host. Such information can be supplied through a database having fields populated by an administrator of the data centers 102. Additionally the power-down/up service 150 can pull temperature data and location within the data center from which the temperature data was acquired. Other information can also be obtained, such as data from an HVAC system or building management service describing an operation of a cooling system and its location. The power-down/up service 150 can use the temperature data or the HVAC data to detect a thermal event. For example, if the temperature data exceeds a predetermined threshold, then the power-down/up service can take corrective action. By correlating the location of the host with the location data associated with the temperature or cooling system, the power-down/up service can make an assessment of whether powering down a host server computer will have sufficient impact on mitigation of the thermal event. Additionally, having information regarding the heat generated by each host, the power-down/up service can make a determination of the overall impact of powering down a host server computer. Although not shown, other parameters can be used in both the power-down/up service 150 and the ranking service 130. For example, if the host server computer executes management functions for the data center 102, it can be considered an important host server computer. Thus, a host server computer that executes the ranking service 130 or the power down/up service 150 can be considered important services that are only shut down after other less important options are exhausted. Additionally, some of the parameters illustrated can be ignored or eliminated.

Once the power-down/up service 150 determines which hardware resources 108 to power down, it can communicate with the hardware resources directly through established protocols. After powering down one or more host server computers or other hardware resources, the power-down/up service can wait a predetermined period of time and then receive additional temperature data or HVAC data, which can be pulled and stored by the resource monitoring component 114 at periodic intervals. Using this information, the power-down/up service can determine whether powering down one or more host server computers has had an impact on the thermal event. Thus, a feedback loop is established wherein the power-down/up service iteratively repeats powering down hardware resources until the thermal event has passed.

Figure 2:
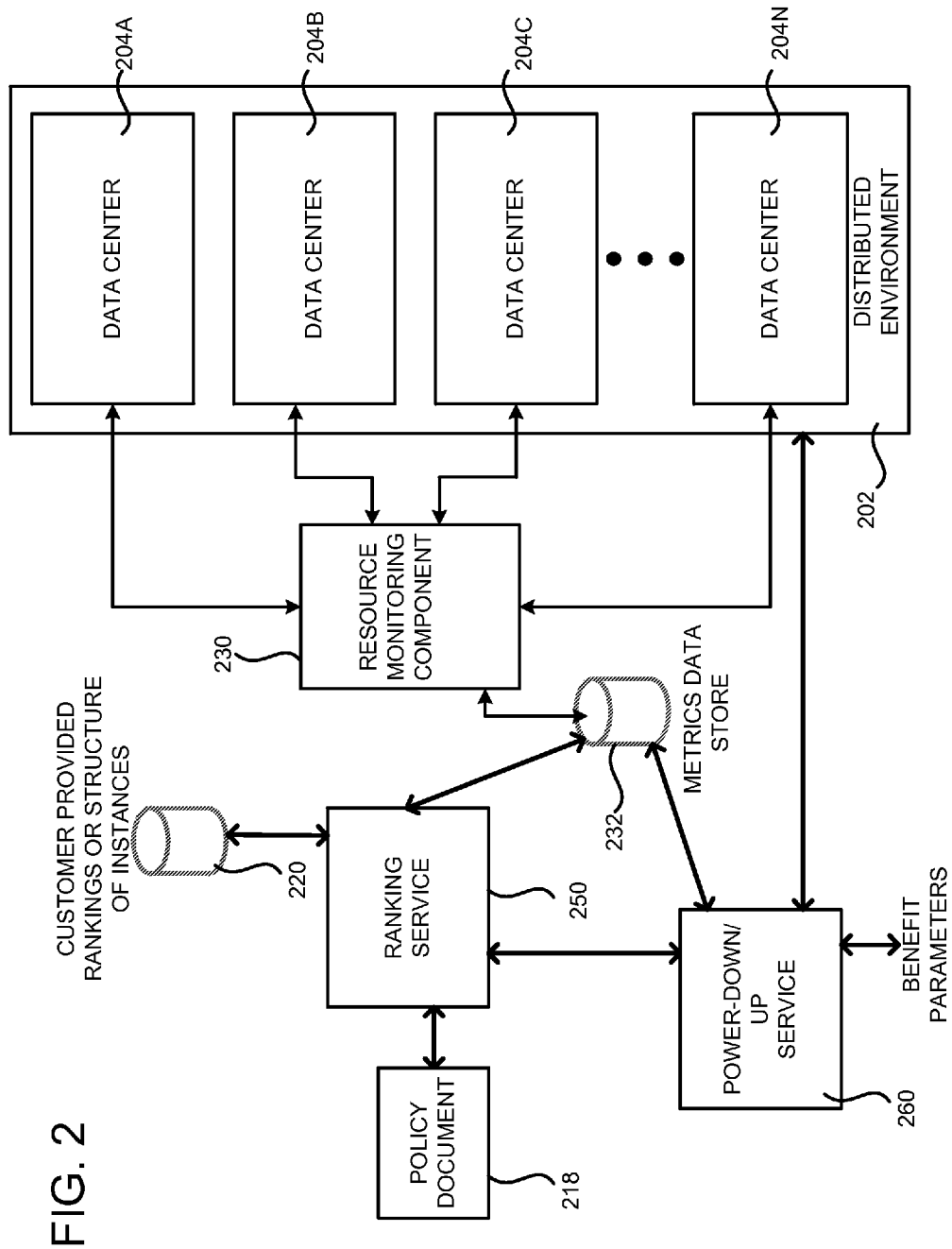
FIG. 2 shows a distributed environment including a plurality of data centers, wherein thermal events can be controlled across the distributed environment.

FIG. 2 is a system and network diagram that shows an illustrative operating environment that includes a distributed environment 202. The instances of computing resources provided by the distributed execution environment 202 can include various types of resources, such as data processing resources, data storage resources, networking resources, data communication resources, and the like. Each type of resource may be general-purpose or may be available in a number of specific configurations. For example, instances of data processing resources may be available as virtual machine instances in a number of different configurations. The virtual machine instances can be configured to execute applications, including Web servers, application servers, media servers, database servers, and other types of applications. Instances of data storage resources can include file storage devices, block storage devices, and the like. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

The instances of resources provided by the distributed environment 202 are enabled in one implementation by one or more data centers 204A-204N (which may be referred to herein singularly as "a data center 204" or collectively as "the data centers 204"). The data centers 204 are facilities utilized to house and operate computer systems and associated components. The data centers 204 typically include redundant and backup power, communications, cooling, and security systems. The data centers 204 might also be located in geographically disparate locations. A client device (not shown) can supply rankings to software instances executing in the data centers, which can be stored in database 220. Alternatively, or, in addition, the customer can provide metadata including a structure of the instances, which can include dependencies between the instances, autoscaling information, failover, etc. Additionally, the client device can provide weighting information stored in a policy document 218.

A resource monitoring component 230 can be coupled to one or more databases and to a metrics data store 232. In this embodiment, the resource monitoring component 230 is positioned outside of the data centers 204 so as to collect data in parallel from the data centers. As previously described, the resource monitoring component can be positioned within one or more of the data centers 204. A ranking service 250 can be coupled to the metrics data store 232 to collect metrics data. The metrics data can include information about instances executing on the host server computers within the data centers 204. For example, the information can include a number of instances running on the host, a length of time that instances have been executing, instance types, etc. The metrics data can also include other information about the hardware resources, such as operational data. For example, an amount of CPU use on a host can be included as one parameter of the operational data. Other parameters can also be used. In an alternative embodiment (not shown), the ranking service 250 can be coupled directly to the resource monitoring component 230 so as to eliminate the need for the metrics data store. The ranking service 250 can use the metrics data together with weightings from the policy document 218 to generate a priority order in which hardware resources in the distributed environment 202 should be powered down.

A power-down/up service 260 can retrieve temperature data or HVAC data from the metrics data store 230 in order to determine if a thermal event is occurring. If a thermal event is detected, the power-down/up service can use ranking information from the ranking service regarding which host server computers to power down in a priority order. The power-down/up service 260 can also receive benefit parameters indicating heat generated by different host server computers, location of the host server computers, etc. Such benefit information can be retrieved from a database (not shown) that can be populated by a network administrator. Additionally, the power-down/up service can retrieve weighting information from the policy document, if desired. Using predetermined algorithms programmed into the power-down/up service 260, it can determine a priority order in which to power down hardware resources, such as host server computers. The power-down/up service 260 can then communicate through standard protocols to the hardware resources in the distributed environment in order to implement the power down.

The ranking service 250 and power down service 260 can be positioned within each data center 204 such that each data center can manage power down operations independently of the other data centers.

Figure 3:
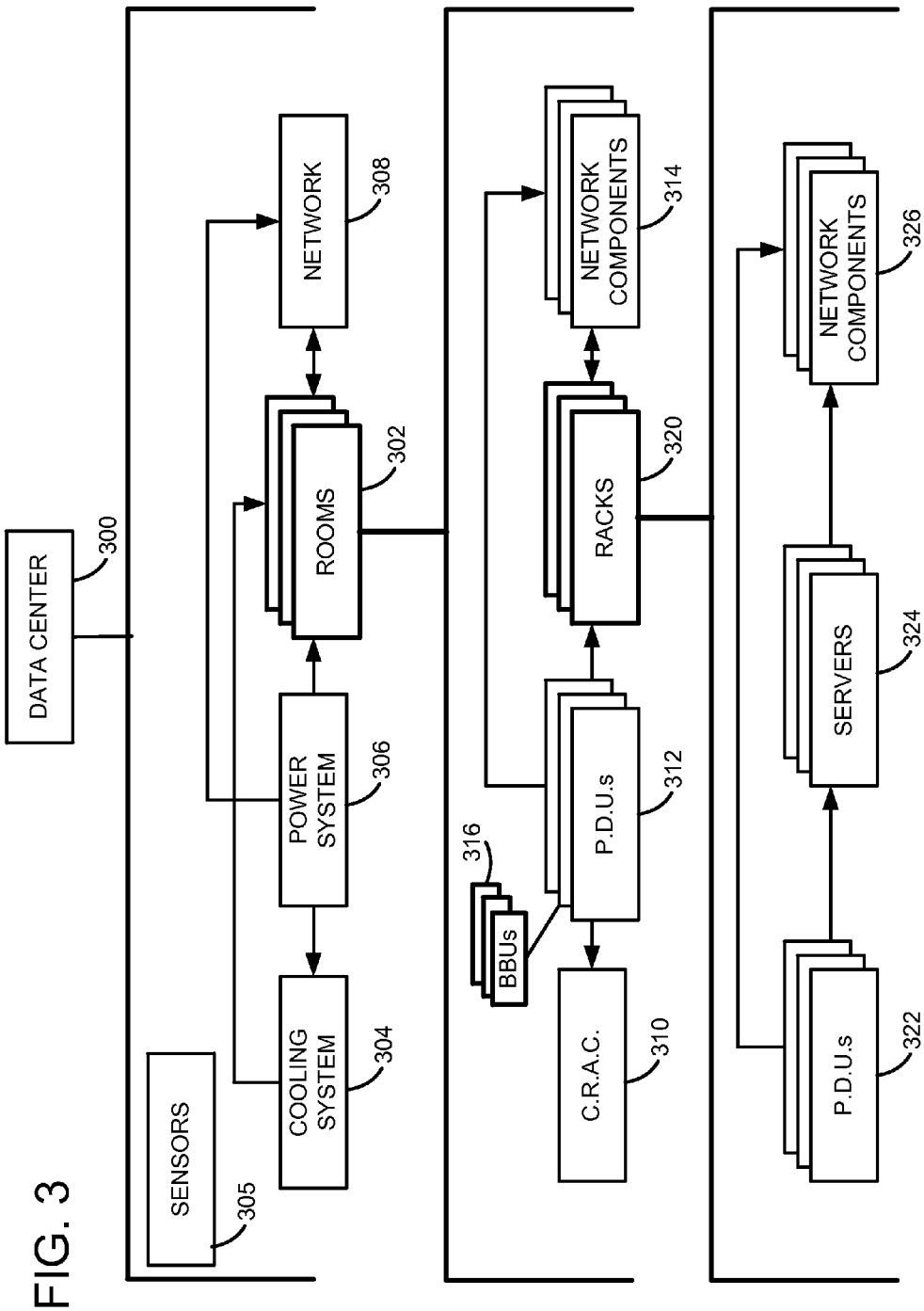
FIG. 3 is a block diagram showing hardware resources that can be within a data center.

FIG. 3 illustrates an example of datacenter components that may be monitored by the resource management component of FIG. 1 or 2. The various datacenter components may be included in implementation of the datacenter 300 to provide computing capacity, storage and other services to any number of customers or internal users. In some embodiments the data center 300 may have more or fewer components than are illustrated in FIG. 3.

The data center 300 may be part of a larger computing system operated by a compute service that includes several data centers 300 across any number of geographical areas. The various data centers 300 may communicate via a network, which can be the network 308 or another network. The network may be a wide area network (WAN), a collection of networks operated by distinct entities, such as the Internet, or some other network. The compute service can provide computing and storage capacity to a single operator, such as a single enterprise (e.g., a company or university). The computing services may include web hosting, data backup and mirroring, disaster prevention and the like. In another embodiment, the compute service provides such computing services and storage capacity to a variety of independent customers, such as a number of different business entities. In yet another embodiment, the compute service can provide computing services and storage capacity to users in the general public.

Customers may access the services on-demand or on a subscription basis. In some embodiments, the customers of the compute service may specify or select a particular computing device hardware and software configuration to use. Customers may then connect to a different physical computing device which satisfies the chosen hardware configuration each time the customer initiates a computing session. Virtual machine images of the chosen software configuration may be dynamically loaded or instantiated on a computing device as part of a computing session initialization process.

As illustrated in FIG. 3, the datacenter 300 may include any number of rooms 302 in which computing devices and other datacenter components that provide the services described above, or which support components which provide the services, are physically located. The datacenter 300 may also include a cooling system 304, a power system 306 and the network 308. For example, the datacenter 300 typically has a power system 306 that connects to a power source, such as the local power grid. The power system 306 may include a power generator for backup or as a primary power source. The power system 306 provides power to the various datacenter components, including the cooling system 304, the network 308 and also the rooms 302.

The various components of the datacenter 300 may emit heat that can be harmful to the function of the components themselves and to other components nearby. Therefore, the data center 300 may include a cooling system 304, such as an air conditioner, that regulates the temperate of the datacenter 300 and its various rooms 302 and components. In some embodiments, a more powerful or more efficient cooling system 304 may be provided instead of, or in addition to, an air conditioner. For example, some datacenters 300 may include a cooling loop that circulates chilled water throughout the datacenter 300 and various rooms 302 thereof and a condenser or evaporative waterfall to cool the water after it has absorbed heat from the datacenter components.

The network 308 can be provided by a number of components, such as routers, switches, hubs and the like. The network 308 components may communicate via cables or wirelessly. In some embodiments, there may be several core switches and/or routers with which the network components of the various rooms 302 communicate to provide redundancy and fault tolerance.

Broadly described, as shown by the hierarchy in FIG. 3, the data center 300 includes rooms 302, which in turn include racks 320. The racks 320 include servers 324 and/or network components 326. A room 302 of the data center 300 can encapsulate a number of data center components and further hierarchical levels. For example, a room 302 may include any number of racks 320 of computing devices, a cooling system 304 component such as any number of computer room air conditioning (CRAC) units 310, any number of power system 306 components such as power distribution units (PDUs) 306 and any number of network components 314 in communication with the network 308 of the data center 300.

The PDUs 312 may include one or more room-level PDUs 312 which each serve power to several racks 320. In such cases the room-level PDUs 312 may connect to rack-level PDUs 322 via cables and power whips. The rack-level PDUs 312 can then distribute power to the devices of the rack 320. In addition, the room-level PDUs 312 can provide power to the CRAC unit 310 and the network components 314.

The network components 314 include room-level switches and/or routers which facilitate communication between the computing devices housed in the racks 320 and the network 308 of the data center 300. For example, a room-level switch 314 may facilitate communication between computing devices on separate 320 racks within the same room. Additionally, the room-level switch 314 may, in combination with the core routers of the data center 300, facilitate communication between computing devices in different rooms 302, or even different data centers 300 and other computing devices outside the network computing provider environment.

The rack 320 may be any frame or enclosure capable of mounting one or more servers or other computing devices. For example, the rack 320 can be a four-post server rack, a server cabinet, an open-frame two-post rack, a portable rack, a LAN rack, combinations of the same, or the like. In some embodiments, the computing devices mounted on the rack 320 may be networking components 326, such as switches or routers, instead of or in addition to servers. For example, the data center room 302 can have, in addition to racks 320 which contain servers 324, one or more racks 320, which may contain any number of switches. In some embodiments, a data center room 302 may contain only one rack 320, or may contain zero racks 320. For example, a data center room 302 may have servers 324 embodied as one or more large-scale computing devices, such as computing appliances or midrange computers, which may not be grouped together physically in a rack 320.

The rack 320 may also encapsulate a number of data center components and additional hierarchical levels, such as PDUs 322, servers 324 and network components 326. For example, the rack 320 may include any number of PDUs 322 and other datacenter components, such as power whips and the like, for providing power from the room-level PDUs 312 to the servers 324 and network components 326 mounted in or associated with the rack 320. The network components 326 of the rack 320 can include top-of-rack (TOR) switches which provide network connectivity between the room-level network components 314 and the servers 324. The network components 326 can also be powered by the rack-level PDUs 322.

Each server 324 can comprise additional data center components, each of which may be monitored, such as a processing unit, a network interface, computer readable medium drive and a memory. The memory generally includes RAM, ROM and/or other persistent or non-transitory memory and may contain a hypervisor for managing the operation and lifetime of one or more virtual machine (VM) instances. In some embodiments, the VM instances are also data center components.

As described above, servers 324 can be configured to host VMs at the request of customers of the network computing provider operating the data center 300. For example, a business entity may rent computing and storage capacity from the network computing provider and may choose a VM configuration or have a VM machine image customized for their needs. A single server 324 may at any time have one, two, or (possibly many) more VMs operating on behalf of customers, actively processing data, responding the customer requests and the like. In some embodiments, the VM's on a given server may be operating on behalf of one, two or possibly many different customers. In some embodiments, the server 324 need not host VMs and therefore the server 324 may not have a hypervisor or VMs in memory.

The server 324 which launches the VM for the customer may receive power, through a power cable, from a rack-level PDU 322 of the rack 320 on which the server 324 is located. The rack-level PDU 322 may in turn receive power through one or more "power whips" or cables from a room-level PDU 312. The power may pass through any number of PDUs in between the rack-level PDU 322 and room-level PDU 312. The room-level PDU 312 can draw power from the power system 306 of the data center 300. The power may come from another PDU or directly from an on-site generator or power source, or from a link to the local power grid outside of the data center 300. One or more battery backup units (BBUs) 316 can be provided for use in a power failure. A BBU 316 can be dedicated to a rack 320 of datacenter components, a single datacenter component (e.g., connected to or associated with the PDU 322), or more than one datacenter component, which can be located on one or more racks.

Each datacenter component involved in the illustrative communication described above can generate heat as it transfers power or communications, or performs other computing operations. Heat can cause the data center components to become damaged or otherwise malfunction and similarly impact nearby components, such as wiring, servers 324, network components 326, 314, PDUs 322, 312, etc. In order to dissipate the heat, a room-level component of the data center cooling system 304 may be used, such as a CRAC 310. In some embodiments, rack-level cooling units may also be implemented, including fans, pipes carrying chilled water and the like. Either rack-level or room-level cooling components and systems may be connected to a datacenter cooling system 304, such as a chiller loop. As will be appreciated, the cooling components of the data center 300 may also be coupled to the power system 306 of the data center 300, as described above with respect the servers 324 (i.e., fans, compressors and pumps typically require electrical power to operate). Sensors 305 can be used to measure temperature and to determine the amount of heat that needs to be removed from a room 302 and/or a rack 320 and/or data center components. The sensors can also be coupled to an HVAC system for the building or other building management services that can detect that the cooling system 304 is malfunctioning or powered down, such that it is not operational.

Figure 4:
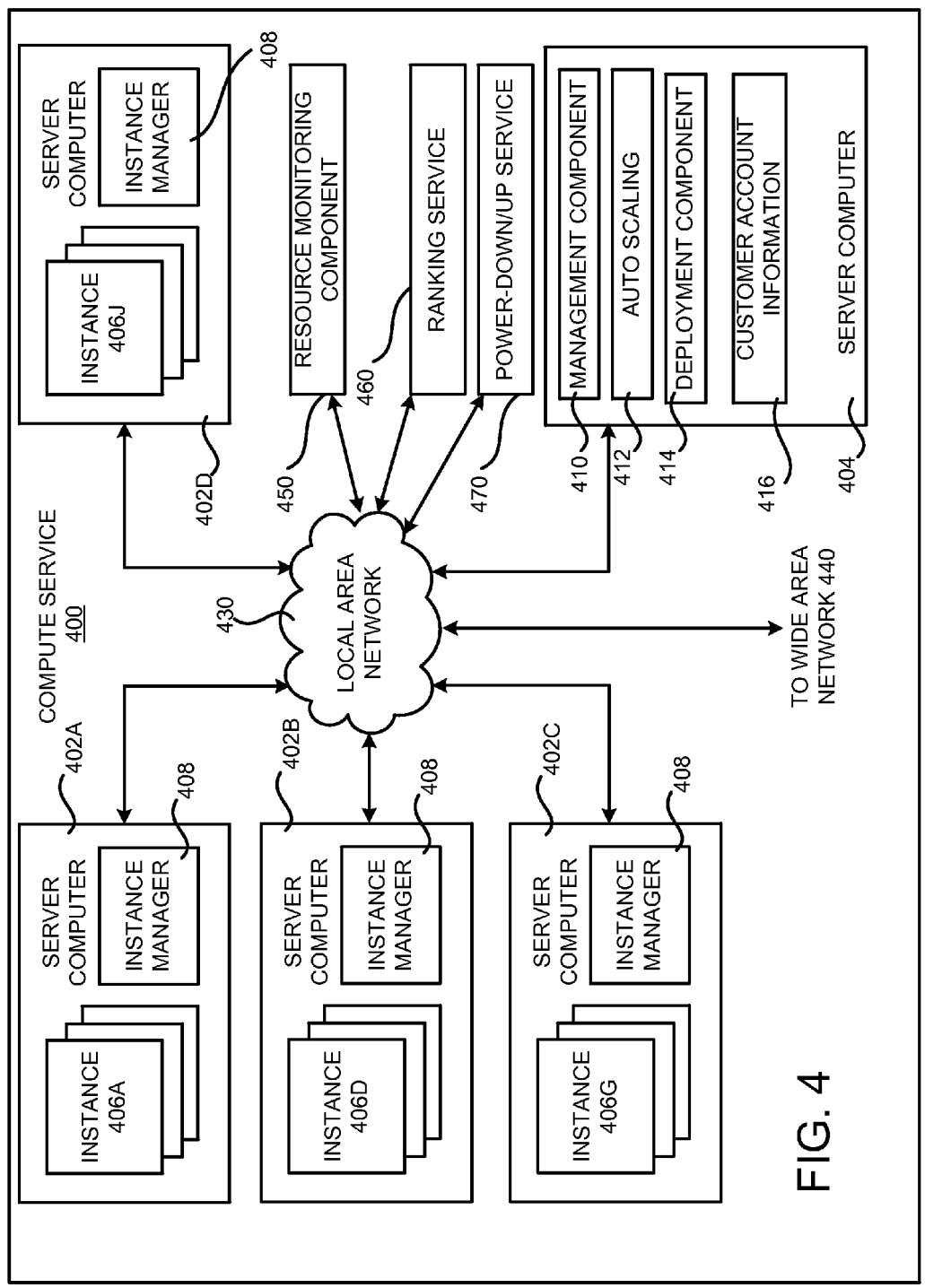
FIG. 4 is a computing system diagram that illustrates one configuration for a data center.

FIG. 4 illustrates how components of the data center 300 can function as a compute service 400. By way of background, the compute service 400 (i.e., the cloud provider) is capable of delivery of computing and storage capacity as a service to a community of end recipients. In an example embodiment, the compute service can be established for an organization by or on behalf of the organization. That is, the compute service 400 may offer a "private cloud environment." In another embodiment, the compute service 400 supports a multi-tenant environment, wherein a plurality of customers operate independently (i.e., a public cloud environment). Generally speaking, the compute service 400 can provide the following models: Infrastructure as a Service ("IaaS"), Platform as a Service ("PaaS"), and/or Software as a Service ("SaaS"). Other models can be provided. For the IaaS model, the compute service 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service platform without the cost of buying and managing the underlying hardware and software. The SaaS model allows installation and operation of application software in the compute service. In some embodiments, end users access the compute service 400 using networked client devices, such as desktop computers, laptops, tablets, smartphones, etc. running web browsers or other lightweight client applications. Those skilled in the art will recognize that the compute service 400 can be described as a "cloud" environment.

The particular illustrated compute service 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute an instance manager 408 capable of executing the instances. The instance manager 408 can be a hypervisor or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include the policy document 218 (FIG. 2). An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414.

Customer account information 416 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404, 450. The network 430 can be a local area network (LAN) and can be connected to a Wide Area Network (WAN) 440 so that end users can access the compute service 400. It should be appreciated that the network topology illustrated in FIG. 4 has been simplified and that many more networks and networking devices can be utilized to interconnect the various computing systems disclosed herein.

A resource monitoring component 450 can be connected through the local area network 430 to the one or more server computers 404, server computers 402, or other server computers (not shown.) The resource monitoring component 450 can gather metrics from any of the available server computers. The resource monitoring service 450 can also use any available services offered by the compute service, such as the customer account information 416. As described above, a ranking service 460 can communicate with the resource monitoring component 450 (or an associated database) to acquire the metrics desired to rank the host server computers in terms of importance. A power-down/up service 470 can communicate with the ranking service 460 and other available storage or services in order to determine which of the server computers 402 to power down or power up in a priority order.

Figure 5:
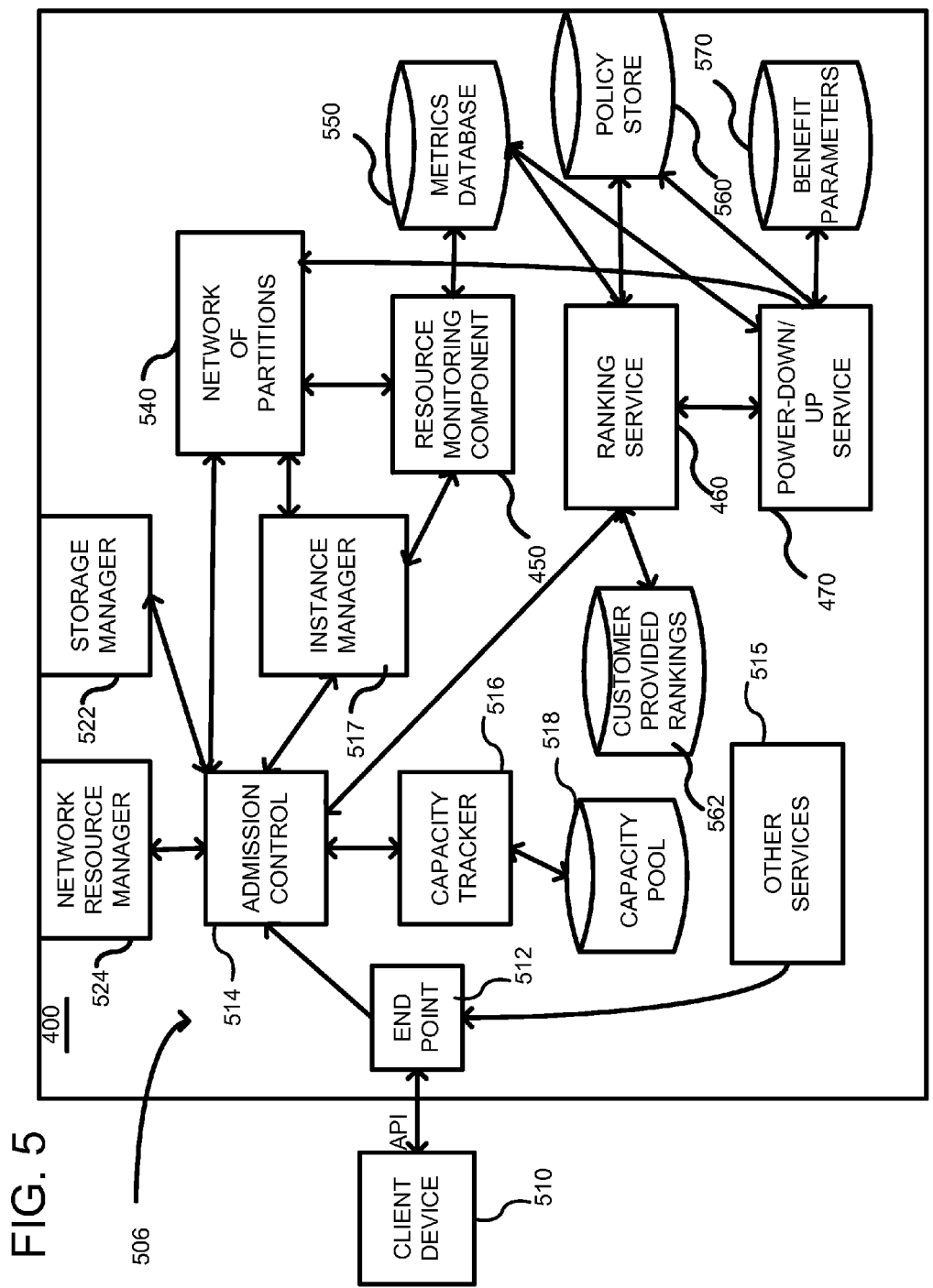
FIG. 5 illustrates particular management-level components that can be used in the data center.

FIG. 5 illustrates in further detail management components 506 that can be used in the multi-tenant environment of the compute service 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service 400 through an end point 512, which can be a DNS address designed to receive and process API requests. In particular, the end point 512 can be a web server configured to expose an API. Other services 515, which can be internal to the compute service 400, can likewise make API requests to the end point 512.

Other general management services that may or may not be included in the compute service 400 include an admission control 514, e.g., one or more computers operating together as an admission control web service. The admission control 514 can authenticate, validate and unpack the API requests for service or storage of data within the compute service 400. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. The instance manager 517 controls launching and termination of instances in the network. When an instruction is received (such as through an API request) to launch an instance, the instance manager pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

The resource monitoring component 450 was described above in relation to FIGS. 1, 2 and 4. In addition to what was already described, the resource monitoring component 450 can provide monitoring of the applications customers run on the compute service 400. System administrators can use the resource monitoring component 450 to collect and track metrics, and gain insight to how applications are running. For example, the resource monitoring service 450 can allow system-wide visibility in which server computers are being utilized. Examples of information that can be obtained includes a length of time that an instance has been operational, an amount of CPU use on a server computer, a number of instances running on a host server computer, temperature information (such as those obtained from sensors 305 of FIG. 3), etc. The resource monitoring component can also be coupled to the instance manager 517, which can alternatively provide information about the instances. For example, the instance manager 517 can provide additional metrics, such as instance types executing on the host server computers. Metrics generated by the resource monitoring component 450 can be stored in the metrics database 550. The ranking service 460 can access the metrics in database 550 to determine any desired metrics associated with instances running in the network of partitions 540. As indicated, a policy store 560, which stores policy information can also be available to the rankings service 460 in order to provide weighting information to the ranking service. Furthermore, customer provided rankings 562 can be available to the ranking service 460. Other inputs to the ranking service can also be used based on the particular design implementation. A power-down/up service 470 can be coupled to the ranking service to receive ranking information regarding which of the host partitions to power down first when there is a thermal event. The power-down/up service 470 can also be coupled to a database 570 in order to receive benefit parameters. The power-down/up service can further be coupled to the metrics database 550 in order to obtain any desired data, such as temperature data. Such temperature data can be used to determine if there is a thermal event. When a thermal event occurs, the power-down/up service 470 can communicate with hardware resources via connection to the network of partitions 540. Using established protocols (e.g., SSH power-down commands), for example, the power-down/up service 470 can communicate with host server computers, or other hardware resources, within the network of partitions in order to power down them down in a systematic and ordered fashion. Using similar protocols, the power-down/up component 470 can power up the host server computers and other hardware resources in an intelligent manner.

Figure 6:
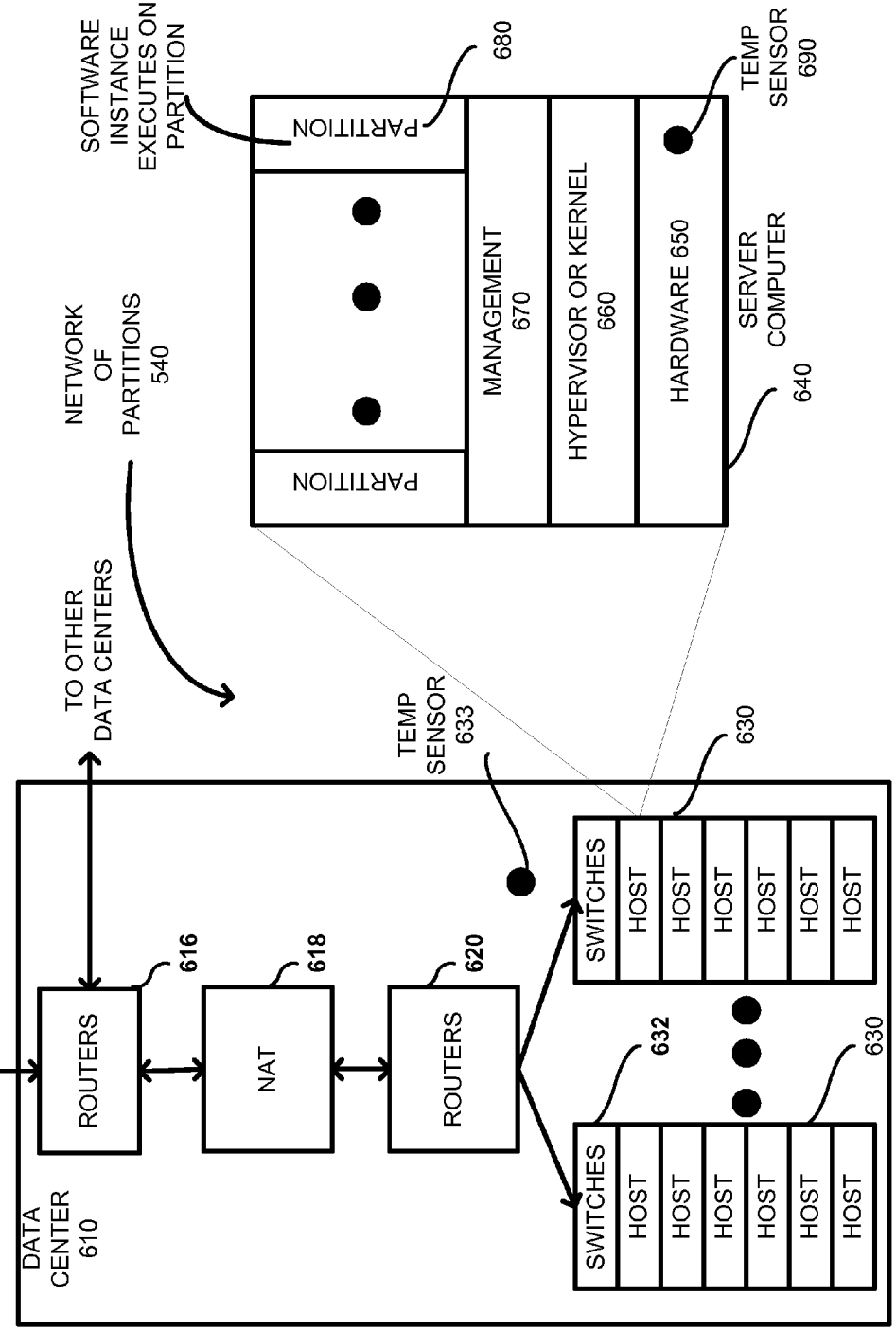
FIG. 6 shows an embodiment of a particular data center as including multiple racks of host server computers, with a host server computer shown with multiple software instances be executed thereon.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. One or more temperature sensors 633 can be placed near the racks 630 to obtain an external temperature adjacent the racks. Alternatively, or additionally, temperature sensors, such as 633, can be strategically positioned anywhere within the data center 610 to obtain temperature readings indicative of a more general temperature measurement within the data center. Such temperature sensors can be considered the sensors 305, generically shown in FIG. 3. A particular host server computer is shown in an expanded view at 640.

Each host 640 has underlying hardware 650 including one or more CPUs, memory, storage devices, etc. The hardware can also include one or more temperature sensors 690 that provide an internal temperature within the host. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 670, which can then pass the metrics to the resource monitoring component 450 for storage in the metrics database 550. Additionally, the management layer 670 can pass to the monitoring component 450 the number of instances that are running, when they were launched, the operating system being used, the applications being run, the temperature sensor 690 information, etc. All such metrics can be used for consumption by the resource monitoring component 450 and stored in database 550. A separate management component (not shown) can also be used to capture the temperature sensor 633 information and pass the same to the resource monitoring component 450 for storage within the database. The management component can also monitor a status of the cooling system and report any malfunction to the resource monitoring component 450.

Figure 7:
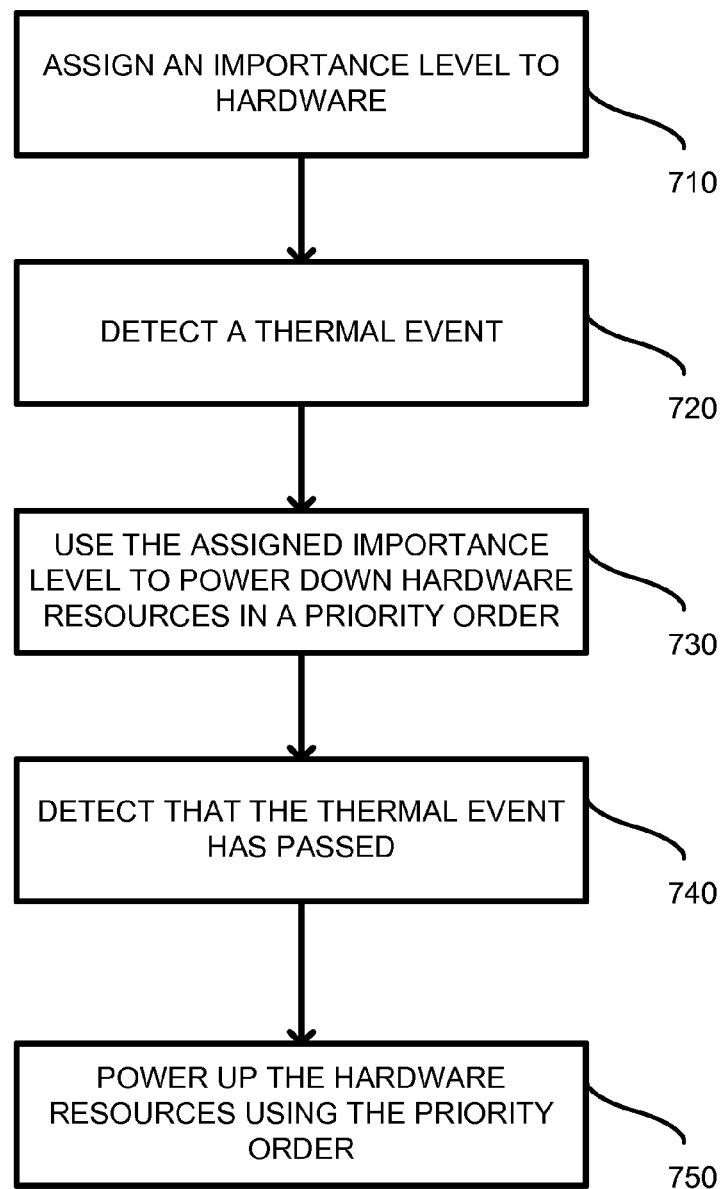
FIG. 7 is a flowchart of a method for mitigating an impact of a thermal event, according to one embodiment.

FIG. 7 is a flowchart of a method for mitigating an impact of a data center thermal event. In process block 710, an importance level can be assigned to hardware resources in a data center. The importance level can be based on how powering down a hardware resource can impact a customer. For example, the importance level can be based on a number of virtual machine instances are running on the hardware resource. A hardware resource that is fully loaded with virtual machines will likely be more important than a hardware resource with few virtual machine instances. Other metrics can be considered in determining an importance level assigned to a hardware resource. For example, another metric can be whether the instances are redundant or failover instances, which only execute when other instances are shut down. Another metric can be an importance of the customer (large customers may be given preferential treatment). Yet another metric can be an amount of CPU usage (a host server computer with high CPU usage indicates a higher level of importance). Still another metric can be a type of instance used. Some instances, such as those that host databases, can be considered more important than other instances. Another metric can be a length of time that an instance is operational. An instance that has been running for months or years is considered more important than an instance that just started. Still another metric can be customer-provided ranking information, such that the customer can identify certain instances as more important. Yet another metric can be an importance of instances, which can be derived from how an instance fits into an overall structure of instances being used by the customer. Such structural information can be provided by the customer, for example. Customer account information can be used, such how much money the customer spends per year, whether the customer is an enterprise customer, etc. Other metrics can be used, such as whether the instance running is a management instance for the compute service 400.

In process block 720, a thermal event can be detected. Detection of a thermal event can be achieved by analyzing sensors in the data center, such as shown in FIG. 3 at 305, FIG. 6 at 633, and/or temperature sensors 690 within the host server computers. In the case of temperature information, it can be compared against one or more predetermined thresholds. For example, if the temperature of a host server computer exceeds a manufacture recommended temperature then the server computer can be considered to have a thermal event. More typically, a temperature of the entire data center or a zone of the data center is monitored to determine if it is above a desired limit, which could impact multiple server computers. Alternatively, if the thermal event relates to the cooling system, an assessment can be made whether the problem with the cooling system can be considered a thermal event. The determination of when there is a thermal event can be within the control of the power-down/up service 150, 260, 470 (for purposes of clarity only the power-down/up service 470 will be used below, but it is understood that the other embodiments can equally be used.) In some embodiments, the power-down/up service 470 can retrieve the predetermined threshold temperature information from the policy store (see 560, FIG. 5) or the policy store can control a definition of what is considered a thermal event in terms of cooling system problems. In other embodiments, a separate service (not shown) can determine that there is a thermal event and communicate the same to the power-down/up service 470 for carrying out the necessary power-down sequence.

In process block 730, the assigned importance levels can be used to power down the hardware resources in a priority order. Generally, less important hardware resources are powered down before more important hardware resources. Desirably, the more important resources will not need to be powered down at all. To power down the resources established protocols can be used to communicate directly with the hardware resources. For example, the power-down/up service 470 can use established protocols (e.g., Unix commands) in order to power down devices in an orderly fashion.

In process block 740, detection can be made that the thermal event has passed. While the power-down/up service shuts down select hardware resources in a data center, it may interactively check for updated thermal data in order to determine if the thermal event has passed. For example, powering down select host server computers should have an impact on the temperature in the data center. The temperature data from the temperature sensors in the data center can be periodically updated so that the power-down/up service can iteratively check an impact of the power-down sequence. Once it is determined that sufficient hardware resources have been powered down to control the thermal event, it can be determined that the thermal event has passed. For example, a second threshold temperature can be used to determine that the thermal event has passed once the temperature is below that second threshold temperature. The second threshold temperature can be different than the first threshold temperature. Example temperatures can be 100 degrees for a first threshold to detect that a thermal event has occurred and 75 degrees for a second threshold temperature to determine that the thermal event has passed. When powering down different hardware resources, a list can be generated, in some embodiments, indicating which hardware resources were powered down. Such a list can be used to power up the hardware resources, as explained further below.

In process block 750, the hardware resources can be powered up using a priority order. For example, the power-down/up service 470 can obtain the rankings from the metrics database 550 to begin powering up hardware resources in a predetermined order. In some embodiments, the power-up order can differ from the power-down order. For example, different weightings can be used for each. Additionally, the list of resources that were powered down can be used to determine which hardware resources to power back up in accordance with the rankings. Alternatively, the power-up commands can be sent in accordance with the rankings and those hardware resources already powered up can ignore the request, while others can power up. Still further, a separate service can monitor a power state of the hardware resources and report the same to the power-down/up service. The power-down/up service 470 can iteratively monitor temperature of the data center to ensure that the temperature does not exceed a threshold temperature. Such a temperature can be yet a third threshold different than the first and second thresholds described above. As long as the temperature remains below the third threshold, the power-down/up service can continue to power up additional hardware resources in accordance with the rankings.

Figure 8:
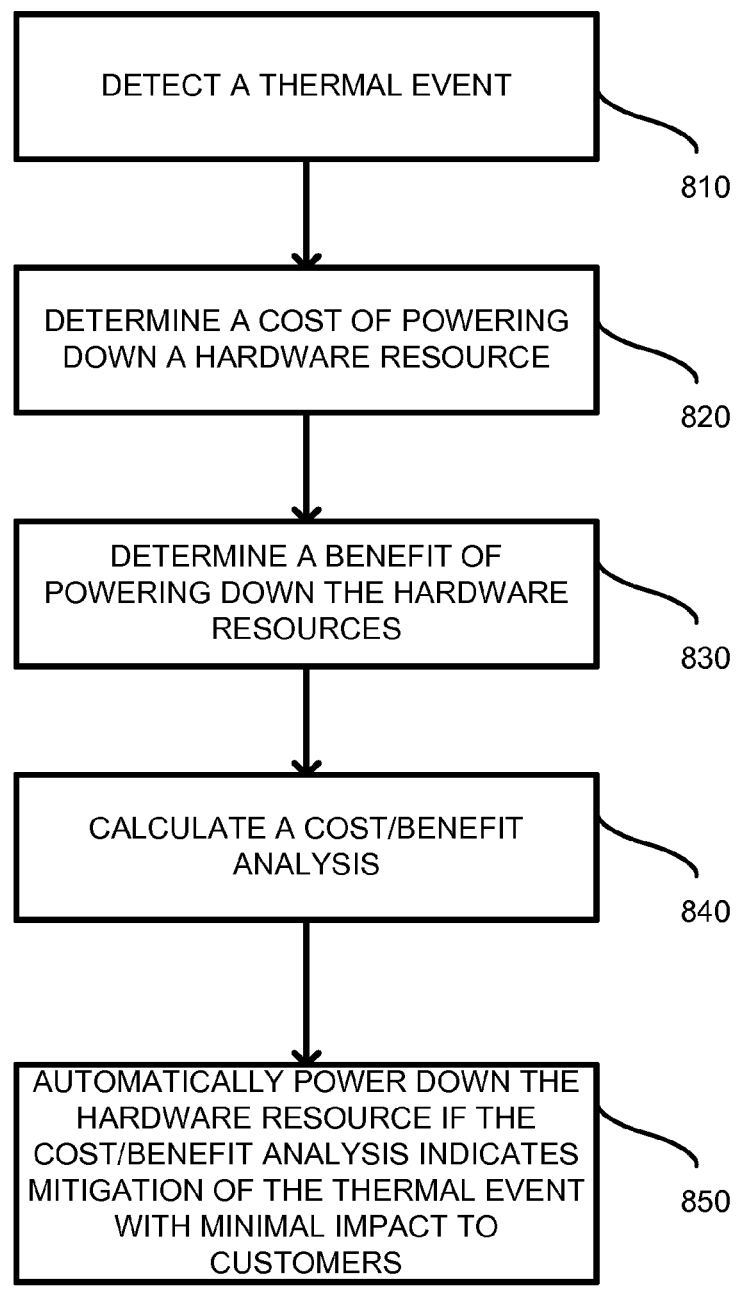
FIG. 8 is a flowchart of a method for mitigating an impact of a thermal event, according to another embodiment.

FIG. 8 is a flowchart according to another embodiment for mitigating an impact of a thermal event. In process block 810, a thermal event can be detected. As previously described, the power-down/up service 470 can be used to monitor temperature data interactively, such as at predetermined intervals, and compare the data to predetermined thresholds. If the temperature exceeds the thresholds, then a thermal event can be considered detected. Alternatively, the power-down/up service 470 can interactively monitor the cooling system. In process block 820, a cost of powering down a hardware resources can be determined. The cost can be determined by the ranking service, such as service 460. It can be presumed that the cost is minimal for the highest ranked hardware resources, i.e., those which are ranked to be shut down the earliest. Thus, the cost is generally related to an impact that shutting down a hardware resource can have on a customer. In process block 830, a benefit of powering down a hardware resource can be determined. Example benefits can be associated with how much heat a host generates or a location of a host. The more heat that a host generates, the more benefit there is to powering it down. Additionally, the location of the host is compared to the temperature sensor or region in the data center which has the thermal problem. Hosts within the region of the thermal problem have a greater benefit to shutting down. The benefit information can be obtained from a database, such as that shown at 570, FIG. 5, which can be populated by an administrator of the data center.

In process block 840, a cost/benefit analysis can be calculated. For example, an algorithm can be used to calculate the cost/benefit analysis. An example algorithm can be as follows: cost/benefit=rankingweight1(ranking parameter 1)+rankingweight2(ranking parameter 2) . . . +rankingweightN(ranking parameter N)/benefitweight1(benefit parameter 1)+benefitweight2(benefit parameter2)+benefitweightM(benefit parameter), where N and M are any integer values. The benefit and ranking weight information can be obtained from the policy store (e.g., 560 in FIG. 5). In process block 850, the cost/benefit analysis can be used to determine whether powering down the hardware resource mitigates the thermal event with minimal impact to customers. For example, a projection can be made on an amount of heat budget needs to be reduced as a projection due to a cooling system shutting down. The cost/benefit analysis includes a determination of whether powering down a set of host server computers meets or exceeds the projection. If so, then the power-down/up service can automatically power down the hardware resource, using techniques already described above.

One or more of the process blocks of FIG. 8 can be repeated and powered down individually based on a cost/benefit assessment in order to mitigate the thermal event. Any of the costs parameters previously described can be used. For example, the costs can be related to a number of instances executing on a hardware resource, or a type of instances executing on a hardware resource. The cost can further be related to whether instances executing on the hardware resource are operationally important to the customer. Such information can be supplied by the customer in terms of dependencies associated with an instance or ranking information associated with an instance. The benefit can be associated with a location of the hardware resource relative to the thermal event or an amount of heat generated by the hardware resource.

Figure 9:
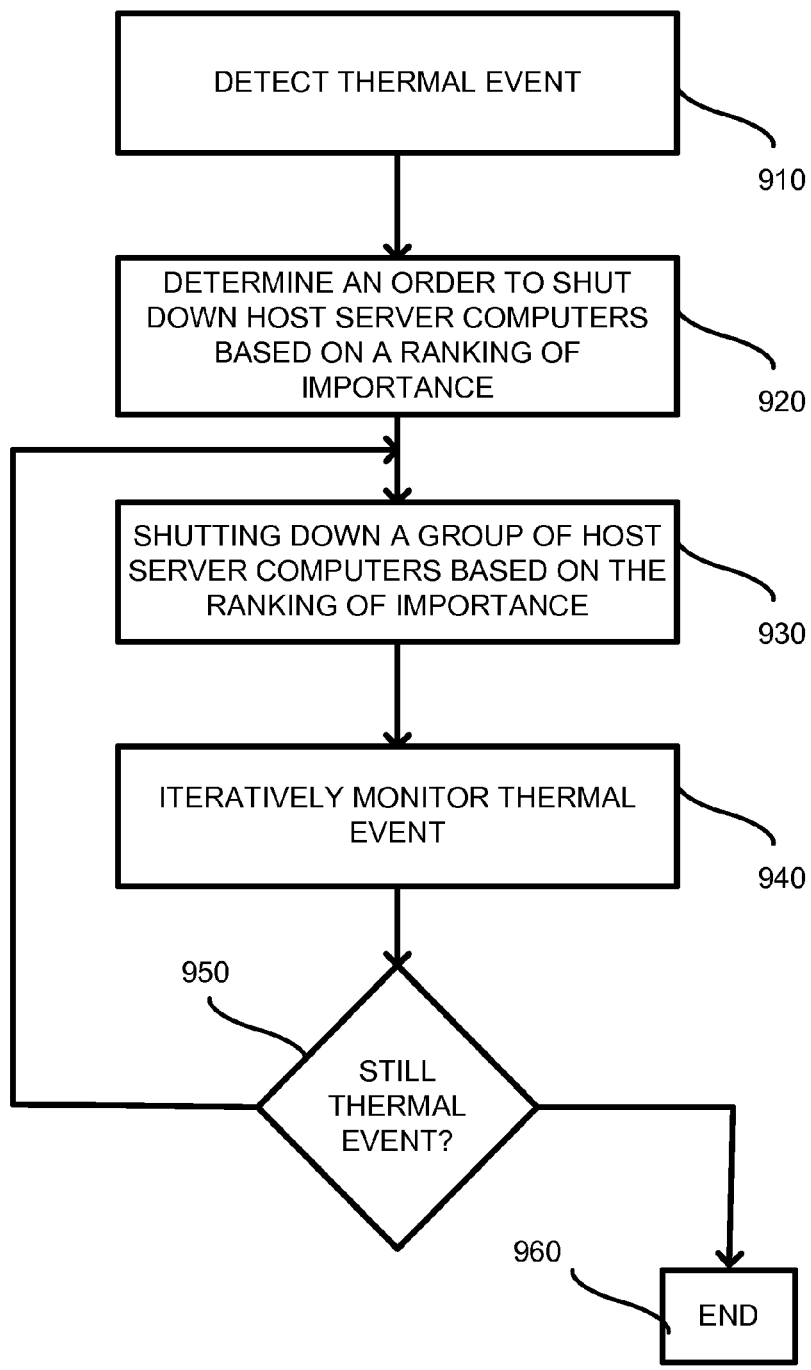
FIG. 9 is a flowchart of a method for mitigating an impact of a thermal event, according to yet another embodiment.

FIG. 9 is a method according to another embodiment for mitigating an impact of a thermal event. In process block 910, a thermal event can be detected, such as an increase in temperature beyond a threshold can be detected or the cooling system can be not operational (e.g., powered off or otherwise malfunctioning). As previously described, the temperature data can be acquired through periodic polling of temperature sensor data in the data center. The temperature data can be compared to predetermined thresholds or thresholds set in a policy document. Whether the cooling system is not operational can be determined based on input received from an HVAC system or building management service. In process block 920, an order to shut down host server computers can be determined. The order can be based on a ranking of importance, wherein importance is associated with how terminating an instance will impact a customer associated with the instance. Thus, the least important host server computers can be powered down first. Shutting down the host server computers can be a preventative measure to ensure that the temperature in the data center remains within an acceptable range. In process block 930, a group of host server computers can be shut down based on the ranking of importance. Thus, rather than powering down host server computers one at a time, they can be shut down in groups, wherein the groups can be any size. In process block 940, the thermal event can be iteratively monitored to determine if it has passed. A delay can be used between process blocks 930 and 940 in order to provide a period of time in which the temperature of the data center can adjust or the cooling system can be powered on or otherwise repaired. In decision block 950, a check can be made whether the thermal event has passed. For example, the thermal event can be passed if the temperature in the data center is stabilized within an acceptable range or the cooling system has be repaired. If not, then shutting down of the group of host server computers can be repeated at process blocks 930 and 940 until the temperature sensor falls within the acceptable range or the thermal event has otherwise passed. If the thermal event has passed, then the process ends at process block 960.

Figure 10:
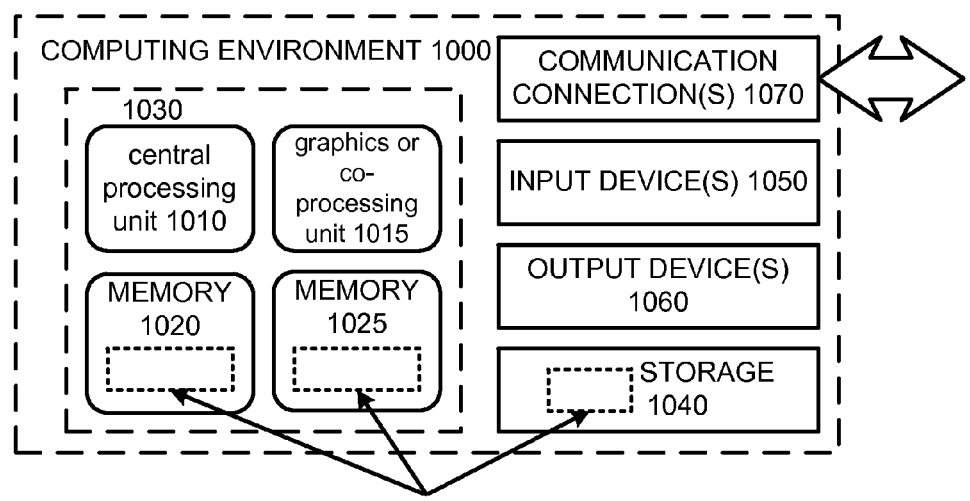
FIG. 10 is a computer architecture diagram showing one illustrative computer hardware architecture for implementing a computing device that can be utilized to implement aspects of the various embodiments described herein.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein. For example, either the ranking service and/or the power-down/up service can be the software 1080.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

For example, although embodiments show the power-down/up service as being separate from the ranking service, they can be combined into a single service. Alternatively, they can be further sub-divided. Thus, logical partitioning of such services is merely a design chose based on a particular implementation.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for mitigating an impact of a data center thermal event, comprising:
   assigning importance levels to host server computers in the data center, the importance levels based on how powering down the host server computers will impact customers using the host server computers;
   detecting a thermal event in the data center;
   using the assigned importance levels, powering down the host server computers in a priority order so that less important host server computers are powered down before more important host server computers;
   detecting that the thermal event has passed; and
   using the assigned importance levels, powering up the host server computers in accordance with the priority order so that more important host server computers are powered up before less important host server computers.

2. The method of claim 1, wherein assigning the importance level of one of the host server computers includes determining an importance based on virtual machine instances running on the host server computer.

3. The method of claim 1, further including determining a benefit of powering down each host server computer, and wherein powering down is based on the benefit and the importance level.

4. The method of claim 3, wherein the benefit is determined based on a location of heat associated with the thermal event.

5. The method of claim 3, wherein the benefit is determined based on an amount of heat generated by each host server computer.

6. The method of claim 1, wherein detecting the thermal event includes detecting that a cooling system has been powered down or is malfunctioning and powering down the host server computers is a preventative measure to mitigate against temperature increases.

7. A computer-readable storage having instructions thereon for executing a method of mitigating an impact of a thermal event on an area containing multiple host server computers, the method comprising:
   detecting the thermal event in the area where the host server computers are located;
   determining a cost of powering down a host server computer;
   determining a benefit of powering down the host server computer so as to reduce the thermal event;
   calculating a cost/benefit analysis based on the determined cost and determined benefit; and
   based on the calculation, automatically powering down the host server computer if the cost/benefit analysis indicates mitigation of the thermal event with minimal impact to customers.

8. The computer-readable storage of claim 7, further including repeating the cost/benefit analysis for each host server computer in the area and powering down each host server computer that mitigates the impact of the thermal event.

9. The computer-readable storage of claim 7, wherein the detecting of the thermal event includes receiving temperature information from one or more temperature sensors in the area, comparing the received temperature information to a predetermined threshold temperature, and if the temperature information exceeds the predetermined threshold temperature, indicating that there is the thermal event.

10. The computer-readable storage of claim 7, wherein determining the cost of powering down the host server computer includes determining a number of software instances executing on the host server computer that will be terminated due to powering down the host server computer.

11. The computer-readable storage of claim 7, wherein determining the cost of powering down the host server computer includes determining a type of instances executing on the host server computer that will be terminated due to powering down the host server computer.

12. The computer-readable storage of claim 7, wherein determining the benefit of powering down the host server computer includes determining a location of the host server computer with respect to a location of the thermal event.

13. The computer-readable storage of claim 7, wherein determining the benefit of powering down the host server computer includes determining an amount of heat generated by the host server computer.

14. The computer-readable storage of claim 7, wherein calculating the cost/benefit analysis includes calculating a ratio of the determined costs and the determined benefits.

15. The computer-readable storage of claim 7, wherein determining the cost of powering down the host server computer includes determining whether instances executing on the host server computer are operationally important to a customer.

16. The computer-readable storage of claim 7, wherein the automatically powering down the host server computer includes transmitting a power-down command using a protocol to the host server computer.

17. The computer-readable storage of claim 7, wherein determining the cost of powering down the host server computer includes determining a percentage of CPU use on the host server computer.

18. A system for mitigating an impact of a thermal event on a data center containing multiple host server computers:
   a plurality of host server computers;
   a ranking service for controlling an order in which the host server computers are powered down when a thermal event occurs, the ranking service receiving a plurality of input parameters and weighting information used to weight an impact of the input parameters; and
   a power down service coupled to the ranking service and to the plurality of host server computers, the power down service for receiving information from the ranking service regarding which host server computers to power down.

19. The system of claim 18, further including a resource monitoring component that receives operational parameters from the host server computers and stores the operational parameters in a data store, wherein the ranking service is coupled to the data store.

* * * * *